US008524107B2

(12) United States Patent
Chang et al.

(10) Patent No.: US 8,524,107 B2
(45) Date of Patent: Sep. 3, 2013

(54) MAGNETOCALORIC STRUCTURE

(75) Inventors: Li Chang, Taoyuan Hsien (TW); Hui-Ling Wen, Taoyuan Hsien (TW); Shih-Pin Meng, Taoyuan Hsien (TW); Chung-Jung Kuo, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 302 days.

(21) Appl. No.: 12/883,765

(22) Filed: Sep. 16, 2010

(65) Prior Publication Data

US 2011/0062373 A1 Mar. 17, 2011

Related U.S. Application Data

(60) Provisional application No. 61/243,390, filed on Sep. 17, 2009.

(51) Int. Cl.

| | |
|---|---|
| ***B22F 3/00*** | (2006.01) |
| ***C04B 35/64*** | (2006.01) |
| ***H01F 1/04*** | (2006.01) |
| ***H01F 1/14*** | (2006.01) |

(52) U.S. Cl.

USPC .............. 252/62.55; 252/62.51 R; 252/518.1; 252/519.1; 252/519.15; 252/521.5; 252/500; 428/546

(58) Field of Classification Search

USPC .......... 252/70, 72, 500, 518.1, 519.1, 519.14, 252/519.15, 521.2, 521.5, 62, 62.51 R; 428/546

See application file for complete search history.

(56) References Cited

U.S. PATENT DOCUMENTS

| | | | | |
|---|---|---|---|---|
| 4,435,242 | A * | 3/1984 | McNulty | 156/264 |
| 4,893,299 | A * | 1/1990 | Humberstone et al. | 369/275.4 |
| 6,826,915 | B2 * | 12/2004 | Wada et al. | 62/3.1 |
| 7,069,729 | B2 * | 7/2006 | Bruck et al. | 62/3.1 |
| 8,061,147 | B2 * | 11/2011 | Dinesen et al. | 62/3.1 |
| 2004/0261420 | A1 * | 12/2004 | Lewis | 62/3.1 |
| 2005/0274454 | A1 * | 12/2005 | Extrand | 156/272.4 |
| 2010/0037625 | A1 * | 2/2010 | Katter | 62/3.1 |
| 2010/0116471 | A1 * | 5/2010 | Reppel et al. | 165/133 |
| 2010/0203238 | A1 * | 8/2010 | Magno et al. | 427/156 |
| 2011/0000279 | A1 * | 1/2011 | Miyazaki et al. | 73/23.35 |
| 2011/0042608 | A1 * | 2/2011 | Reesink | 252/67 |
| 2011/0140031 | A1 * | 6/2011 | Katter et al. | 252/62.55 |

FOREIGN PATENT DOCUMENTS

| | | | |
|---|---|---|---|
| WO | WO 2008099234 | A1 * | 8/2008 |
| WO | WO 2008099235 | A1 * | 8/2008 |
| WO | WO 2009090442 | A1 * | 7/2009 |

* cited by examiner

*Primary Examiner* — Peter F Godenschwager
*Assistant Examiner* — Jane L Stanley
(74) *Attorney, Agent, or Firm* — Muncy, Geissler, Olds & Lowe, PLLC

(57) ABSTRACT

A magnetocaloric structure includes a magnetocaloric material and at least one protective layer. The magnetocaloric material has bar type or plank type. The protective layer is disposed on the magnetocaloric material.

17 Claims, 3 Drawing Sheets

MAGNETOCALORIC STRUCTURE

CROSS-REFERENCE TO RELATED APPLICATIONS

This is a non-provisional application that claims priority to U.S. Provisional Patent Application No. 61/243,390 filed Sep. 17, 2009, herein incorporated by reference in its entirety.

BACKGROUND

The present invention relates to a magnetocaloric structure.

Lately, a superconductive technology was developed rapidly. As the application field of the superconductive technology was expanded, the natural trend of a freezer is miniaturization and high performance. It is required that the miniature freezer be lighter weight, smaller and higher thermal efficiency, and the miniature freezer is being applied to various application fields.

The miniature freezer has many conventional magnetocaloric structures and a working fluid. The problems associated with the conventional magnetocaloric structures include being breakable, easy to block the flowing way of the working fluid, lower stabilization, lower heat conductive rate and easy to oxidize. Thus, the conventional freezer with the magnetocaloric structure has many limitations in use and is vulnerable.

SUMMARY

The present invention provides a magnetocaloric structure to increase stabilization and lifetime.

The present invention provides a magnetocaloric structure, which comprises a magnetocaloric material and at least one protective layer. The magnetocaloric material has bar type or plank type. The protective layer is disposed on the magnetocaloric material.

The present invention provides a magnetocaloric structure. The magnetocaloric structure comprises a magnetocaloric material and at least one protective layer. The protective layer is disposed on the magnetocaloric material. The protective layer is a physically-resistant material or a chemically-resistant material. The magnetocaloric material has bar type, plank type or particle type.

The material of the protective layer includes a metal, an organic metal composite, inorganic metal composite, a carbonaceous compound, or a higher heat conductive, lower permeable material. The protective layer can be a film or a flake.

The magnetocaloric structure further comprises at least one concave-convex structure disposed on the magnetocaloric material and the protective layer. The concave-convex structure has a polygonal shape, a curved shape or an irregular shape. The number of the concave-convex structure is more than two, and the concave-convex structures are irregularly arranged, regularly arranged, bar-shaped arranged, or matrix arranged. The protective layer is formed by chemical vapor deposition or physical vapor deposition. The size of the protective layer is less than 3 μm or 1 μm.

In the magnetocaloric structure, the magnetocaloric material comprises manganese (Mn), iron (Fe), phosphorus (P), or arsenic (As). The general formula of the magnetocaloric material is $MnFeP_{1-y}As_y$, where $0.1 \leqq y \leqq 0.9$, $0.2 \leqq y \leqq 0.8$, $0.275 \leqq y \leqq 0.725$, $0.3 \leqq y \leqq 0.7$, or $y=0.5$.

Because the magnetocaloric structure of the present invention is in a special shape or has a protective layer, the magnetocaloric structure has higher resistance to impact force, larger endothermic area, higher anti-oxidation, higher stabilization, and longer lifetime. The magnetocaloric structure of the present invention does not block the flowing way of working fluid.

DESCRIPTION OF THE DRAWINGS

The present invention can be more fully understood by reading the subsequent detailed description and examples with references made to the accompanying drawings, wherein.

DETAILED DESCRIPTION

Figure 1:
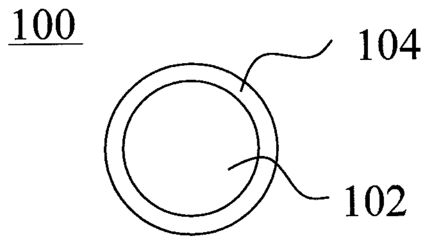
FIG. 1 is a partial schematic sectional view of a magnetocaloric structure according to one embodiment of the present invention.

The magnetocaloric structure of the present invention comprises a magnetocaloric material and at least one protective layer.

The magnetocaloric material may have non-sphere type, bar type, plank type or particle type. When the magnetocaloric material is bar type or plank type, the magnetocaloric material has better resistance to impact force and higher stabilization.

Besides, the magnetocaloric structure can have one or more concave-convex structures. For example, the concave-convex structure is disposed on the magnetocaloric material or the protective layer. When the number of the concave-convex structure is more than two or three, each concave-convex structure can only be disposed on a single surface or different surfaces of the magnetocaloric structure. When the number of the concave-convex structure is more than two, the concave-convex structures are irregularly arranged, regularly arranged, bar shaped arranged or matrix arranged. Preferably, the concave-convex structure has a polygonal shape, a curved shape, or an irregular shape. The polygonal shape can be a triangle shape or a quadrangle shape. The curved shape can be an arc shape, an oval-shape or a curved shape. The concave-convex structure can be used to increase the contact surface area (or endothermic area), the impact strength or the heat-transmission efficacy ratio of the magnetocaloric structure.

In the magnetocaloric structure, the magnetocaloric material comprises manganese (Mn), iron (Fe), phosphorus (P), or arsenic (As). The formula of the magnetocaloric material is $P_{1-y}As_y$. For example, the magnetocaloric material is $MnFeP_{1-y}As_y$, where $0.1 \leqq y \leqq 0.9$, $0.2 \leqq y \leqq 0.8$, $0.275 \leqq y \leqq 0.725$, $0.3 \leqq y \leqq 0.7$ or y=0.5. When the y value is within the above range, the magnetocaloric material has a better magnetic entropy change (MEC) to get a better magnetocaloric effect.

The protective layer can be disposed on the magnetocaloric material or cover the magnetocaloric material, such that the protective layer increases the physical resistance and/or chemical resistance of the magnetocaloric material without decreasing hot-transmission efficacy. The material of the protective layer can be a physically-resistant material or a chemically-resistant material. For example, the material of the protective layer can be a metal, an organic metal composite, inorganic metal composite, a carbonaceous compound, or a material having higher heat Conductivity and lower permeability. The protective layer can be a film or a flake, which is formed by chemical vapor deposition or physical vapor deposition. The physical vapor deposition can be electroplating or sputtering. The size of the protective layer is less than 3 μm or 1 μm. The shapes of the protective layer and the magnetocaloric material can be the same or different. The protective layer can enhance the magnetocaloric material by providing a physically-resistant function, a chemically-resistant function, or longer lifetime. The physically-resistant function may be a heat conduction function or an anti-impact force function. The chemically-resistant function may be an anti-corrosion function.

Because the magnetocaloric structure of the present invention has a special shape or includes the protective layer, the magnetocaloric structure has higher resistant to impact force, a larger endothermic area, higher anti-oxidation, higher stabilization, and longer lifetime. Therefore, the magnetocaloric structure of the present invention does not block the flowing way of working fluid.

Referring to FIG. 1, the magnetocaloric structure 100 has a magnetocaloric material 102 and a protective layer 104. The magnetocaloric material 102 can be a block type or bar type with a circular cross-section or oval-shaped cross-section. The protective layer 104 is disposed on the surface of the magnetocaloric material 102.

Figure 2:
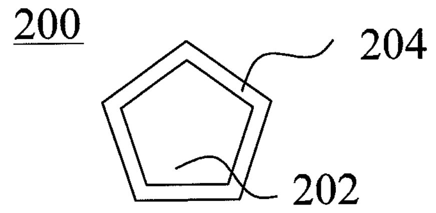
FIG. 2 is a partial schematic sectional view of a magnetocaloric structure according to another embodiment of the present invention.

Referring to FIG. 2, the magnetocaloric structure 200 has a magnetocaloric material 202 and a protective layer 204. The magnetocaloric material 202 can be a block type or bar type with a polygonal shaped cross-section. The protective layer 204 is disposed on the surface of the magnetocaloric material 202.

Figure 3:
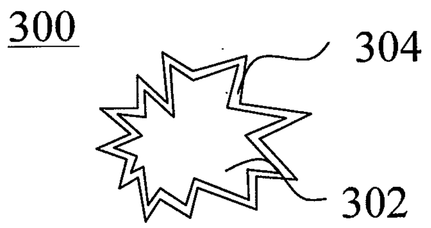
FIG. 3 is a partial schematic sectional view of a magnetocaloric structure according to still another embodiment of the present invention.

Referring to FIG. 3, the magnetocaloric structure 300 has a magnetocaloric material 302 and a protective layer 304. The magnetocaloric material 302 has a block type or bar type with an irregular shaped cross-section. The protective layer 304 is disposed on the surface of the magnetocaloric material 302.

Figure 6:
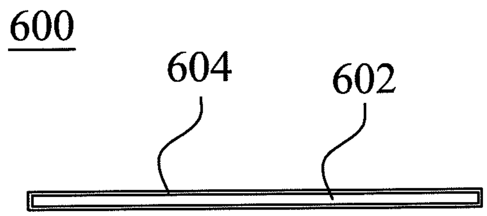
FIG. 6 is a partial schematic sectional view of a magnetocaloric structure according to yet still another embodiment of the present invention.

Referring to FIG. 6, the magnetocaloric structure 600 has a magnetocaloric material 602 and a protective layer 604. The magnetocaloric material 602 has a plank type. The protective layer 604 is disposed on the surface of the magnetocaloric material 602.

Figure 4:
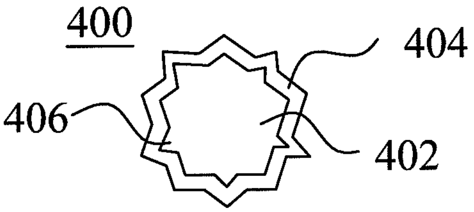
FIG. 4 is a partial schematic sectional view of a magnetocaloric structure according to yet another embodiment of the present invention.

Referring to FIG. 4, the magnetocaloric structure 400 has a magnetocaloric material 402 and a protective layer 404. The magnetocaloric material 402 has a block type or bar type. The protective layer 404 is disposed on the surface of the magnetocaloric material 402. A concave-convex structure 406 is formed by the protective layer 404 and the magnetocaloric material 402.

Figure 5:
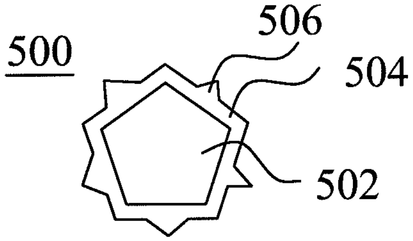
FIG. 5 is a partial schematic sectional view of a magnetocaloric structure according to still yet another embodiment of the present invention.

Referring to FIG. 5, the magnetocaloric structure 500 has a magnetocaloric material 502 and a protective layer 504. The magnetocaloric material 502 has a block type or bar type. The protective layer 504 is disposed on the surface of the magnetocaloric material 502. A concave-convex structure 506 is formed only by the protective layer 504 or the magnetocaloric material 502.

Figure 7:
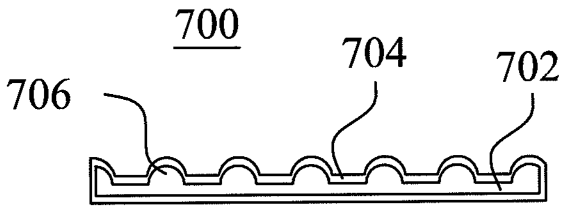
FIG. 7 is a partial schematic sectional view of a magnetocaloric structure according to still yet another embodiment of the present invention.

Referring to FIG. 7, the magnetocaloric structure 700 has a magnetocaloric material 702 and a protective layer 704. The protective layer 704 is disposed on the surface of the magnetocaloric material 702. A concave-convex structure 706 is formed on one surface of the protective layer 704 and the magnetocaloric material 702.

Figure 8:
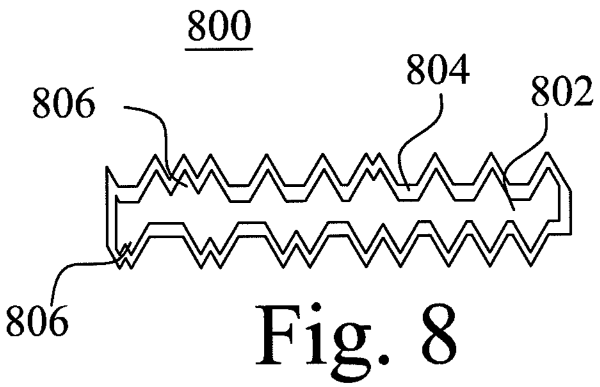
FIG. 8 is a partial schematic sectional view of a magnetocaloric structure according to yet still another embodiment of the present invention.

Referring to FIG. 8, the magnetocaloric structure 800 has a magnetocaloric material 802 and a protective layer 804. The protective layer 804 is disposed on the surface of the magnetocaloric material 802. A concave-convex structure 806 is formed on two or more surfaces of the protective layer 804 and the magnetocaloric material 802.

Because the shape of the magnetocaloric structure or the concave-convex structure has above variation, the magnetocaloric structure can have better anti-impact force function or heat-transmission efficacy ratio.

While the present invention has been described with respect to preferred embodiments, it is to be understood that the present invention is not limited thereto, but is intended to accommodate various modifications and equivalent arrangements made by those skilled in the art without departing from the spirit of the present invention.

What is claimed is:

1. A magnetocaloric structure, comprising:

a magnetocaloric material having a non-sphere shape, a bar shape or a plank shape; and at least one protective layer disposed on the magnetocaloric material, wherein the protective layer comprises an organic metal composite, an inorganic metal composite, or a carbonaceous compound, wherein the protective layer comprises at least one concave-convex structure formed on the surface thereof, and the concave-convex structure has an irregular arrangement.

2. The magnetocaloric structure as claimed in claim 1, wherein the protective layer is a film or a flake.

3. The magnetocaloric structure as claimed in claim 1, wherein the magnetocaloric material has a concave-convex surface.

4. The magnetocaloric structure as claimed in claim 3, wherein the concave-convex surface is irregularly arranged, or regularly arranged.

5. The magnetocaloric structure as claimed in claim 1, wherein the protective layer is formed by chemical vapor deposition or physical vapor deposition.

6. The magnetocaloric structure as claimed in claim 1, wherein the magnetocaloric material comprises manganese (Mn), iron (Fe), phosphorus (P), or arsenic (As).

7. The magnetocaloric structure as claimed in claim 6, wherein the magnetocaloric material is $MnFeP_{1-y}As_y$, where $0.1 \leqq y \leqq 0.9$.

8. The magnetocaloric structure as claimed in claim 1, wherein the size of the protective layer is less than 3 μm.

9. A magnetocaloric structure, comprising:

a magnetocaloric material;

at least one protective layer, disposed on the magnetocaloric material, the protective layer being a physically-resistant material or a chemically-resistant material, wherein the protective layer comprises at least one concave-convex structure formed on the surface thereof, and the concave-convex structure has an irregular arrangement.

10. The magnetocaloric structure as claimed in claim 9, wherein the protective layer comprises a metal, an organic metal composite, an inorganic metal composite, or a carbonaceous compound.

11. The magnetocaloric structure as claimed in claim 9, wherein the protective layer is a film or a flake.

12. The magnetocaloric structure as claimed in claim 9, wherein the magnetocaloric material has a concave-convex surface.

13. The magnetocaloric structure as claimed in claim 12, wherein the concave-convex surface is irregularly arranged, or regularly arranged.

14. The magnetocaloric structure as claimed in claim 9, wherein the protective layer is formed by a chemical vapor deposition or a physical vapor deposition.

15. The magnetocaloric structure as claimed in claim 9, wherein the magnetocaloric material comprises manganese (Mn), iron (Fe), phosphorus (P), or arsenic (As).

16. The magnetocaloric structure as claimed in claim 15, wherein the magnetocaloric material is $MnFeP_{1-y}As_y$, where $0.1 \leqq y \leqq 0.9$.

17. The magnetocaloric structure as claimed in claim 9, wherein the magnetocaloric material has a bar shape, a plank shape, or a particle shape.

* * * * *